United States Patent Office 3,287,392
Patented Nov. 22, 1966

3,287,392
CYCLOBUTANE DERIVATIVES
Edward U. Elam, Kingsport, Tenn., assignor to Eastman Kodak Company, Rochester, N.Y., a corporation of New Jersey
No Drawing. Filed Dec. 9, 1963, Ser. No. 329,259
2 Claims. (Cl. 260—464)

This invention relates to novel cyclobutane derivatives and more particularly to novel 2,2,4,4-tetraalkyl-1,3-cyclobutanediisocyanides and 2,2,4,4-tetraalkyl-1,3-cyclobutanedicarbonitriles and to a method for preparing them.

Except for a recent publication subsequent to the date of my invention (Lautenschlaeger et al., Can. Jour. of Chem., 41, No. 4, April 1963, 863–875) there appears to be no report in the literature of 1,3-cyclobutanediisocyanides or dicarbonitriles. Certain 1,2-cyclobutanedicarbonitriles have been disclosed [Coyoner et al., J. Am. Chem. Soc., 71, 324–6 (1949); and Albisetti et al., ibid., 78, 472–4 (1956)], but in these compounds the cyano groups are attached to adjacent carbon atoms of the ring and, therefore, are not suitable for preparing the useful derivatives which can be made from the 1,3-cyclobutanedicarbonitriles of the present invention.

The products and the method of the invention can be represented as follows:

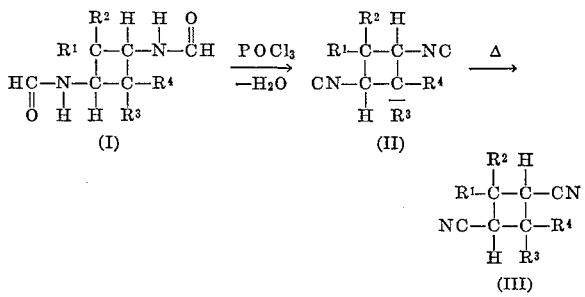

wherein the substituents $R^1$, $R^2$, $R^3$ and $R^4$ are the same or different lower alkyl groups. The method is carried out by dehydrating a 2,2,4,4-tetraalkyl-1,3-cyclobutanediformamide (I) to yield the novel diisocyanide (II) and then heating the latter to effect rearrangement to the novel dicarbonitrile (III).

The dehydration of the formamide to the diisocyanide can be carried out according to the procedure of I. Ugi, Organic Syntheses, 1961, e.g., by heating with phosphorus oxychloride in pyridine.

The rearrangement of the diisocyanides to the dicarbonitriles requires careful control. The diisocyanide must be heated rapidly to a temperature above about 250° C. in order to effect rearrangement without side reactions. Reaction temperatures from about 250 to 500° C. can be employed, but the best results are obtained in the range of 300 to 450° C. Reaction times from 0.1 second to 5 minutes can be used, but for the best yields of the desired dicarbonitrile, the reaction time should be from about 5 to 15 seconds. These reaction times refer to the total time of heating from room temperature to reaction temperature. The dinitrile once formed is stable to heating for fairly long periods. However, it is important to avoid holding the diisocyanide for long periods at temperatures above about 50° C. and below the temperatures at which it rearranges to the nitrile.

The tetraalkyl-1,3-cyclobutanediformamides used as the starting materials can be prepared by reacting a 2,2,4,4-tetraalkyl-1,3-cyclobutanediamine with formic acid. The diamine can be obtained by catalytic hydrogenation of the corresponding tetraalkyl-1,3-cyclobutanedionedioxime and the dioxime can be obtained by the reaction of the corresponding tetraalkyl-1,3-cyclobutanedione with hydroxyl amine hydrochloride according to the procedures disclosed by Elam et al., U.S. 3,107,395. The tetraalkyldiones are dialkylketene dimers and can be made by the method of Canadian Patent No. 618,772 or by procedures disclosed in Organic Reactions, volume III, chapter 3, John Wiley & Sons, publishers.

The following examples illustrate the method and the products of the invention and the preparation of the starting materials:

*Example 1*

This example illustrates the preparation of a tetraalkylcyclobutanediformamide.

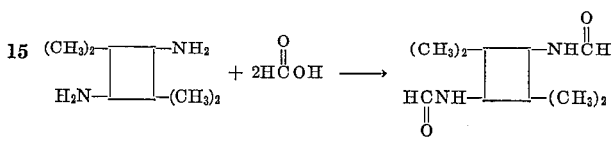

Forty-four grams of a mixture of cis- and trans-isomers of 2,2,4,4-tetramethyl-1,3-cyclobutanediamine was placed in a flask which was equipped with a thermometer, dropping funnel, and reflux condenser, cooled in an ice bath, and treated with 60 g. of 98% formic acid. After addition of the formic acid had been completed, the reflux condenser was removed and the mixture was heated until all of the water had distilled off and the temperature of the residue had reached 260°. The residue consisted of mixed cis- trans-isomers of 2,2,4,4-tetramethyl-1,3-cyclobutanediformamide, which melted from 183 to 228° C. The isomers were separated by fractional crystallization to give pure cis- (M.P. 216–7°) and trans- (M.P. 256–7°) 2,2,4,4-tetramethyl-1,3-cyclobutanediformamide.

*Example 2*

This example illustrates the dehydration of the diformamide.

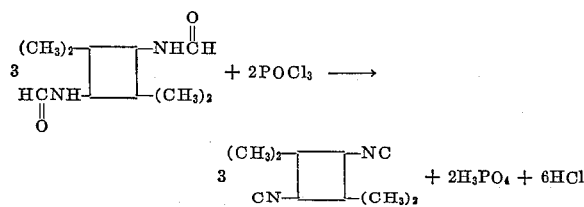

A suspension of 19.8 g. of trans-2,2,4,4-tetramethyl-1,3-cyclobutanediformamide in a mixture of 100 ml. of pyridine (dried over barium oxide) and 65 ml. of petroleum ether was placed in a three-necked flask which was equipped with a stirrer, reflux condenser, and dropping funnel, and 24 g. of phosphorous oxychloride was added gradually, with continuous stirring and cooling in an ice bath. After addition of the phosphorous oxychloride had been completed, the mixture was stirred and heated to 55° C. for one hour. The mixture was cooled, treated with 200 ml. of water, and filtered. The solid material was digested successively with 1% aqueous hydrochloric acid, saturated sodium bicarbonate solution, and finally rinsed with water. After air-drying, the diisocyanide weighed 13.3 g., M.P. 136–137°.

*Analysis.*—Calcd. for $C_{10}H_{14}N_2$: N, 17.3. Found: N, 17.2.

*Example 3*

Cis - 2,2,4,4 - tetramethyl-1,3-cyclobutanediisocyanide, M.P. 57.5–58.5° C., is prepared analogously.

Example 4

This example illustrates the thermal rearrangement of the isocyanides to the corresponding nitriles.

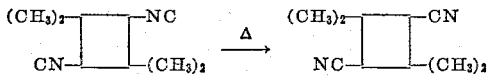

A solution of 10 g. of trans-2,2,4,4-tetramethyl-1,3-cyclobutanediisocyanide in approximately 50 ml. of benzene was dropped slowly into a Vycor tube which was filled with Vycor chips and heated in a vertical electrical tube furnace. The temperature, as measured by a thermocouple in the center of the tube, varied from 375–425° C. during the run. Most of the benzene was evaporated from the product and the residue was cooled and filtered, and the solid washed with benzene and dried in an oven at 120° C. The yield was 8.3 g., M.P. 147–52° C.

*Analysis.*—Calcd. for $C_{10}H_{14}N_2$: N, 17.3. Found (identical product from a duplicate experiment): N, 17.4.

Example 5

The cis isomer of 2,2,4,4-tetramethyl-1,3-cyclobutanedicarbonitrile, prepared similarly, melts at 100° C.

The following compounds are prepared similarly, starting with the corresponding diformamide which, in turn, is prepared from the diamine and formic acid. $R^1$, $R^2$, $R^3$, and $R^4$ refer to the substituents in the 2 and 4 positions on the cyclobutane ring in the general formula given above.

| Ex. | $R^1$ | $R^2$ | $R^3$ | $R^4$ |
|---|---|---|---|---|
| 6 | $CH_3$ | $C_2H_5$ | $CH_3$ | $C_2H_5$ |
| 7 | $CH_3$ | $i\text{-}C_3H_7$ | $CH_3$ | $i\text{-}C_3H_7$ |
| 8 | $CH_3$ | $C_4H_9$ | $CH_3$ | $C_4H_9$ |
| 9 | $C_2H_5$ | $C_4H_9$ | $C_2H_5$ | $C_4H_9$ |
| 10 | —$CH_2CH_2CH_2CH_2CH_2$— | | —$CH_2CH_2CH_2CH_2CH_2$— | |

The novel 2,2,4,4-tetraalkyl-1,3-cyclobutanedicarbonitriles are useful as chemical intermediates for producing useful diamines. For example, they can be converted to the diamine by hydrogenation in the presence of a metallic hydrogenation catalyst, e.g., ruthenium, at elevated temperature and pressure as shown by the following equation:

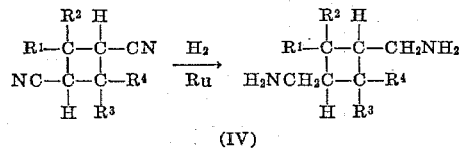

(IV)

The next example illustrates the above reaction.

Example 11

This example describes the preparation of trans-2,2,4,4-tetramethyl-1,3-cyclobutanebis(methylamine) by catalytic hydrogenation of the corresponding dinitrile.

A solution of 75 g. of trans-2,2,4,4-tetramethyl-1,3-cyclobutanedicarbonitrile in 300 ml. of methanol was hydrogenated over 10 g. of 5% ruthenium on carbon catalyst at 125° C., 2500–3000 p.s.i. Product was filtered and distilled to give 35 g. of diamine, B.P. 104–6° C. (8 mm.). The neutralization equivalent of this fraction was 85.9 (calcd. for $C_{10}H_{22}N_2$: 85.2).

A sample of the diamine was reacted with excess phenyl isothiocyanate to give a bis(phenylthiourea), M.P. 232–3° C. (decompn.).

*Analysis.*—Calcd. for $C_{24}H_{32}N_4S_2$: C, 65.5; H, 7.3; S, 14.5 Found: C, 65.5; H, 7.3; S, 14.6.

The 2,2,4,4-tetraalkyl-1,3-cyclobutanedicarbonitrile can also be chemically reduced to the diamine IV, e.g., by treatment with lithium aluminum hydride in tetrahydrofuran.

The diamine IV can be reacted with dicarboxylic acids such as sebacic, adipic, etc. to yield polyamides which can be formed into fibers, films, and molded articles. The polyamides of these diamines have a number of valuable characteristics including thermal stability, toughness, good impact strength and elongation, and low melt viscosity. Depending on the choice of acid, the polyamides can melt at moderate temperatures or at high temperatures and can have high or low crystallinity. The next example illustrates the preparation of such a polyamide.

Example 12

A polyamide was prepared from sebacic acid and the trans-2,2,4,4-tetramethyl-1,3-cyclobutanebis(methylamine) described in Example 11. In a 100 ml. glass flask equipped with a stainless steel stirrer, provision for maintaining an atmosphere of nitrogen, and provision for applying reduced pressure was placed 6.06 g. (0.03 mole) of sebacic acid and 5.2 g. (0.0306 mole) of diamine. Fifty-one ml. of an ethyl alcohol solution containing 0.102 g. diamine per ml. was used. Ten ml. of cresol was also added to the flask. The contents of the flask were heated with stirring while maintaining an atmosphere of nitrogen over the reaction mixture. The ethyl alcohol was distilled off rapidly and the temperature of the heating bath raised to 200° C. Stirring under nitrogen was continued at 200° C. for 30 min. and then at 240° C. for 1 hr. The cresol solution was viscous at this stage. Pressure in the flask was then reduced gradually to about 0.1 mm. Hg pressure. Stirring and heating were continued for 30 min. under vacuum to distill out the cresol and complete polymerization. A viscous, light amber colored melt was obtained. The vacuum was bled to atmospheric pressure with nitrogen. Fibers were pulled from the melt. They could be cold drawn to give strong filaments. The inherent viscosity of the resulting polyamide, as measured in 60 parts phenol plus 40 parts tetrachloroethane at a concentration of 0.23 g. per 100 ml., was 0.61. The polymer was crystalline and had a melting point range of 210–216° C. The melting point was determined by sealing a small amount of polymer in a capillary tube under nitrogen and heating the tube on the hot stage of a microscope. The melting point was taken from the point where the polymer particles started changing shape to the point where they underwent melt flow.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A compound of the following structural formula

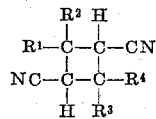

wherein $R^1$, $R^2$, $R^3$ and $R^4$ are lower alkyl groups and in which the cyano groups are positioned on opposite sides of the plane of the cyclobutane ring of said compound.

2. Trans 2,2,4,4-tetramethyl-1,3-cyclobutanedicarbonitrile.

References Cited by the Examiner

Ugi et al.: Chemische Berichte, volume 93, 1960, pages 239–240.

Ugi et al.: Organic Synthesis, volume 41, 1961, pages 13 to 15.

Lautenschlaeger et al.: Canadian Journal of Chemistry, volume 41, April 1963, pages 863, 865, 871 to 874.

CHARLES B. PARKER, *Primary Examiner.*

JOSEPH P. BRUST, *Assistant Examiner.*